United States Patent [19]

Yamaguchi et al.

[11] Patent Number: 5,146,440
[45] Date of Patent: Sep. 8, 1992

[54] TRACK SEARCH APPARATUS

[75] Inventors: Hiroyuki Yamaguchi, Hirakata; Mitsuro Moriya, Neyagawa; Shin-ich Yamada, Hirakata, all of Japan

[73] Assignee: Matsushita Electric Industrial Co., Ltd., Osaka, Japan

[21] Appl. No.: 397,860

[22] Filed: Aug. 24, 1989

[30] Foreign Application Priority Data

Aug. 29, 1988 [JP] Japan .................................. 63-213971
Dec. 26, 1988 [JP] Japan .................................. 63-328239

[51] Int. Cl.⁵ .................................................. G11B 7/00
[52] U.S. Cl. .................................. 369/32; 369/44.25; 369/43; 369/44.34; 360/78.04; 360/78.06; 360/78.09
[58] Field of Search ............... 369/32, 44.28, 44.25, 369/54, 124, 44.34, 59, 43; 358/336; 360/78.11, 78.14, 78.06, 78.09, 32, 78.04

[56] References Cited

U.S. PATENT DOCUMENTS 4,926,405  5/1990  Hangai et al. ......................... 369/32

FOREIGN PATENT DOCUMENTS 0236195  9/1987  European Pat. Off. .
0265138  4/1988  European Pat. Off. .
0270357  6/1988  European Pat. Off. .
0274420  7/1988  European Pat. Off. .
0304299  2/1989  European Pat. Off. .

Primary Examiner—Donald McElheny, Jr.
Assistant Examiner—Robert Chevalier
Attorney, Agent, or Firm—Stevens, Davis, Miller & Mosher

[57] ABSTRACT

A track search apparatus is composed of an actuator such as voice coil motor for moving a light beam to traverse tracks, a position detector for detecting that the light beam has reached a predetermined position in front of a target track, a velocity detector for detecting the velocity of the light beam, and acceleration/deceleration controller such as microcomputer for applying, to the actuator, a driving signal according to the output from the velocity detector when a signal is generated from the position detector.

18 Claims, 6 Drawing Sheets

TRACK SEARCH APPARATUS

BACKGROUND OF THE INVENTION

The present invention relates to a track search apparatus for searching or accessing a desired track from a recording medium having many tracks.

As a prior art apparatus, there has been Proposed an optical type recording and reproduction apparatus, for example.

In the optical type recording and reproduction apparatus, a light beam, which is produced from an optical source such as a semiconductor laser diode, is irradiated and focused through a focusing lens onto an information medium (hereinafter referred to as a disk) which has an optically recordable and reproduceable material film formed on the surface of a substrate having concentric uneven-structured tracks by means of vacuum evaporation. And during the signal reproduction, the light amount thereof is fixed comparatively weakly to do signal read in terms of the light reflected from the disk, whereas during the signal recording, the light amount thereof is modulated (weak or strong) according to the signal to be recorded to do signal write.

In such an optical type recording and reproduction apparatus, focusing control for controlling the light beam to be always in a substantially predetermined focusing state on the recording material film and tracking control for controlling the light beam to be always located on the track are performed. Also in order to randomly access the tracks on the disk by the light beam, track search control is carried out in which deactivating the tracking control, the light beam is shifted in the direction of the disk radius toward a target track and the tracking control is activated again when the light beam arrives at the target track. The prior art relative to the track search is disclosed in U.S. Pat. No(s). 4,106,058, 4,332,022, etc.

One of the important things relative to the track search is the speed when the light beam enters an object track, that is, a tracking pull-in speed. The control frequency for tracking control has a limitation, specifically is usually limited to about several KHz's. For this reason, if the tracking pull-in speed is too high, the pull-in of tracking control into a target track will result in failure; on the other hand if the tracking speed is too low, it will take a long time to perform the track search.

Therefore, in shifting the light beam in the direction of the disk radius in the track search, velocity control of controlling the speed of the light beam is performed in order to control the tracking pull-in speed accurately thereby doing the stabilized pull-in of tracking control into a target track.

The track search is carried out by shifting the light beam in the direction of the disk radius in such a way that the speed of the light beam becomes the predetermined reference velocity corresponding to the present position of the light beam during the track search operation.

The present speed of the light beam required to do the track search is detected by the period of a track traversing signal produced when the light beam traverses a certain track. The present position of the light beam is obtained by counting track traversing signals accumulated from a start track in the track search. FIGS. 2a to 2d show a tracking error signal and a tracking traversing signal produced when the light beam traverses tracks in the direction of the disk radius. Specifically, FIG. 2a shows the manner that the light beam traverses the tracks on the disk and FIG. 2b shows the tracking error signal thus produced.

The tracking error signal can be derived in the manner of FIGS. 2a and 2b by means of the push-pull method for an uneven-structured track with the optical depth of approximately $\lambda/8$ assuming that the wavelength of the light beam is $\lambda$. This is disclosed in detail in Japanese Patent Publication No. 59-9085 (published in Feb. 29, 1984) and French Patent 7529707 (published in Sep. 29, 1975) and hence the explanation will be omitted here.

FIG. 2c shows the waveform of a binary signal into which the tracking error signal was converted and FIG. 2d shows an edge detection signal represented by the detected rising edges of the waveform of FIG. 2c. Each pulse of the edge detection signal is generated when the light beam traverses the center of each track as seen from FIG. 2a, and therefore the edge detection signal represents a track traversing signal. Thus, the value obtained by counting this track traversing signal from the start of track search indicates the present position of the light beam. Moreover, since tracks are formed at substantially regular intervals of P on the disk in the direction of the disk radius, the speed of the light beam, assuming that the period of the track traversing signal is T, can be expressed by $$V = P/T \tag{1}$$

FIG. 2e shows the edge detection signal with both detected rising edges and falling edges of the signal of FIG. 2c. Assuming that the period of this edge detection signal is t, the speed of the light beam can be likewise expressed by $$V = P/2t \tag{2}$$

However, detecting the speed of the light beam from the period of the track traversing signal as mentioned above makes the speed detection intermittent, thereby producing phase delay due to sampling. Hence, the frequency band for speed control could not be made sufficiently high. Consequently, in the conventional optical type recording and detection apparatus, if in carrying out the track search, the eccentricity involved in the disk is large, or vibration or shock is applied to the apparatus, control error in the speed control could become large and the tracking pull-in speed could also become too high thereby leading to failure of the pull-in of tracking control for an object track; on the other hand, if the tracking pull-in speed is too low, it could take a long time to complete the track search.

SUMMARY OF THE INVENTION

An object of the invention is to provide a track search apparatus capable of accurately controlling the speed of conversion means which scans a target track.

In order to attain the above object, the present invention is made up of conversion means for reproducing signals from an information medium having tracks; shifting means for shifting the conversion means to traverse the tracks; speed detection means for detecting the shifting speed of the conversion means; position detection means for detecting that the conversion means has arrived at a predetermined position in front of a target track; and acceleration/deceleration control means for applying to the shifting means a driving signal according to an output from the speed detection means when a signal is generated from the position detection means.

In accordance with the above arrangement, even if large disturbance, for example, is applied to the apparatus, by detecting the speed of the conversion means in front of the target track and applying the driving signal for suitable acceleration/deceleration, the speed of the conversion means which scans the object track can be controlled with high accuracy so that the track search can be carried out in a stabilized manner.

DESCRIPTION OF THE PREFERRED EMBODIMENT

Figure 1:
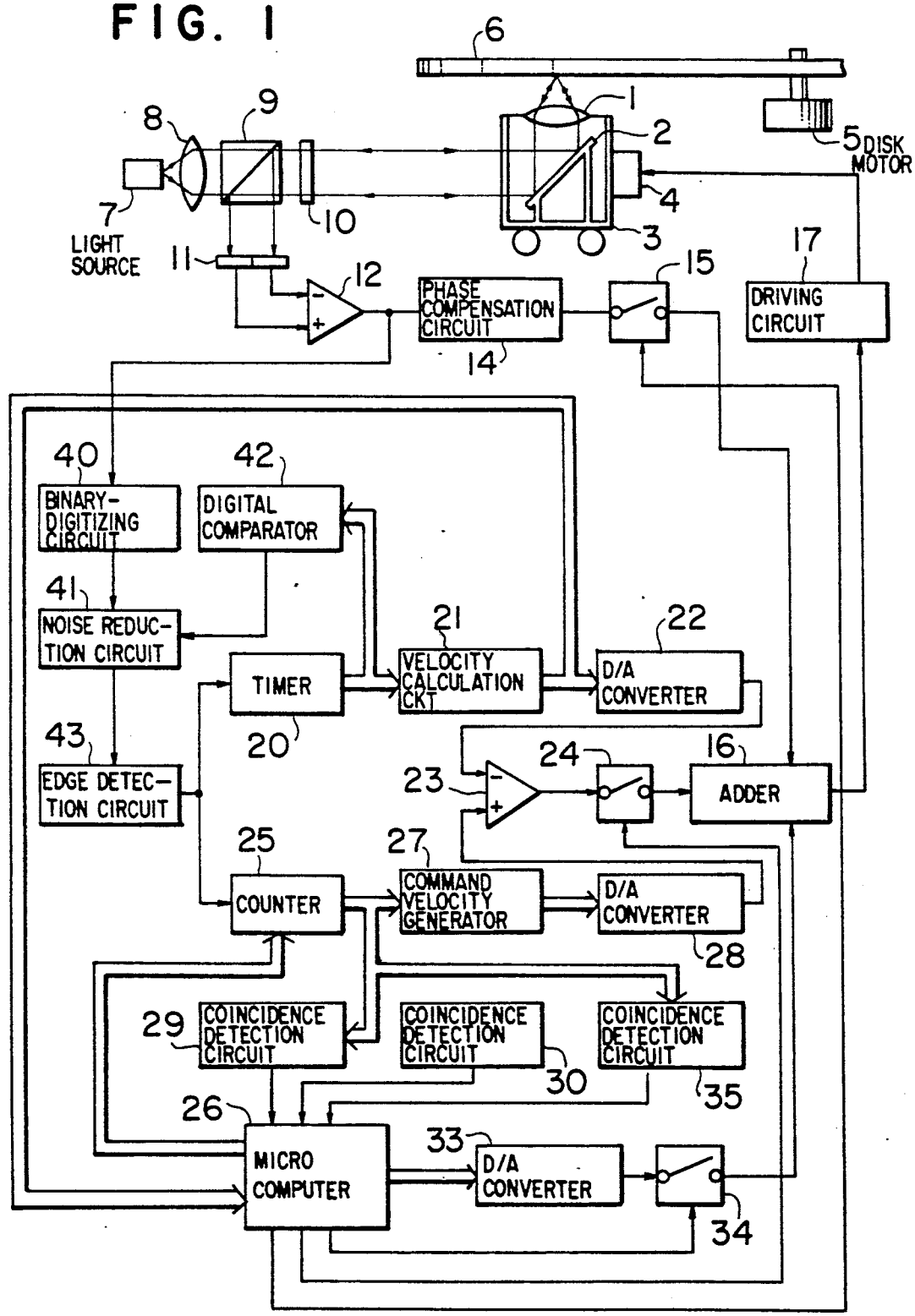
FIG. 1 is a block diagram of a track search apparatus according to one embodiment of the present invention.

FIG. 1 shows the track search apparatus according to one embodiment of the present invention in block form. In FIG. 1, an objective or focusing lens 1' and a reflecting mirror 2, mounted on a transfer table 3, are adapted to be driven by a voice coil motor 4 substantially in the radius direction of a disk 6 which is being rotated by a disk motor 5. A light beam emitted from a light source 7 such as a semiconductor diode passes through a collimator lens 8 which serves to convert the light beam into a parallel light. The parallel light thus formed passes through a beam splitter 9 and a $\frac{1}{4}\lambda$ plate 10 ($\lambda$ is the wavelength of the light beam) and irradiated to the reflecting mirror 2 mounted on the transfer table 3. The light beam reflected by the reflecting mirror 2 is focused by the objective lens 2 to be irradiated to the disk 6. The reflecting light from the disk 2 passes through the objective lens 1 and reflected by the reflecting mirror 2. It further passes through the $\frac{1}{4}\lambda$ plate 10, is reflected by the beam splitter 9 and is incident to a two-divided photodetector 11.

Figure 2:
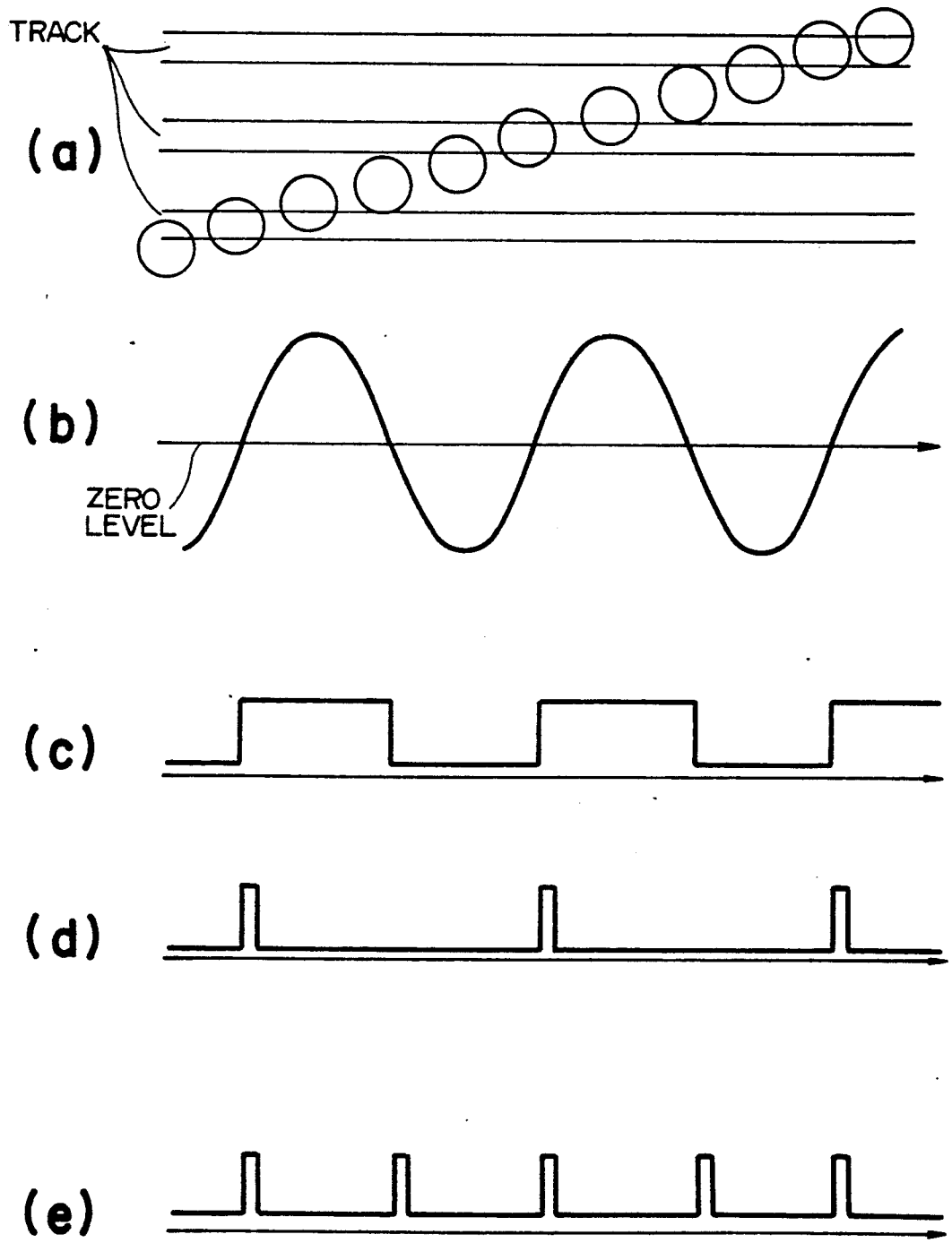
FIGS. 2(a) to 2(e) are views for explaining a tracking error signal and a track traversing signal when a light beam traverses tracks.

The divisional line of the two-divided photo detector 11 is arranged so that it is in the longitudinal direction of the track on the light receiving surface. An output signal from the two-divided photo-detector is sent to a differential amplifier 12. The tracks on the disk are formed in the uneven structure with the optical depth of $\lambda/8$ ($\lambda$ is the wavelength of the light beam). The tracks are provided with the addresses for discriminating the individual tracks in the form of the presence or absence of the track in the track longitudinal direction. As described above, it is known that an output signal thus formed from the differential amplifier 12 forms the tracking error signal as shown in FIG. 2b.

The output signal from the differential amplifier 12 is sent to the voice coil motor 4 through a phase compensation circuit 14, a switch 15, an adder 16, and a driving circuit 17, which constitutes a tracking control loop. The phase compensation circuit 14 is provided to assure the control stability in the tracking control, and the switch 15 is provided to switch the enabling and the disabling of the tracking control.

The output signal from the differential amplifier 12 is also inputted to a binary-digitizing circuit 40 (A/D converter), and it converts the output signal of the differential amplifier 12 into a binary signal which is applied to a noise reduction circuit 41. The noise reduction circuit 41 serves to remove or reduce the noise included in the binary signal due to disk flaws and equipment noise (device noise). The detailed arrangement thereof will be described later. The noise reduction circuit 41 is constituted in such a manner that its noise reduction characteristic is switched externally, and a command signal of commanding the switching of the noise reduction characteristic is inputted from a digital comparator 42. An output signal from the noise reduction circuit 41 is sent to an edge detection circuit 43, which in turn detects the rising edge of the output signal from the noise reduction circuit 41 to produce a track traversing signal (FIG. 2d).

An output signal from the edge detection circuit 43 is sent to a timer 20. The timer 20 serves to measure the period of the output signal from the edge detection circuit 43 to produce the measured value in a digital value. The measured value is sent to a velocity calculation circuit 21. The velocity calculation circuit 21 serves to calculate the velocity DV of the light beam from the measured value in the timer 20 in accordance with the following equation.

$$DV = P/DT \qquad (3)$$

where P is a track pitch, and DT is the measured value in the timer 20.

The velocity value output from the velocity calculation circuit 21 as a value taken intermittently as a sample for each track traversing so that the velocity calculation circuit 21 is adapted to hold the velocity value from a certain sampling to at least the subsequent sampling.

The velocity value output from the velocity calculation circuit 21 is converted into an analog value by a D/A converter 22. This analog signal is sent to the voice coil motor 4 through a differential circuit 23 (one of the two input terminals), a switch 24, the above adder 16, and the above driving circuit 17 to perform velocity control. The switch 24 serves to switch the activation and deactivation of the velocity control.

The measured value in the timer 20 is also sent to a digital comparator 42. The digital comparator 42 serves to compare the measured value in the timer 20 with a reference value incorporated in the digital comparator 42 to produce a low level command signal if the former is larger than the latter and produce a high level command signal under the other condition.

The track traversing signal outputted from the edge detection circuit 43 is also a counter 25 which is capable of presetting the counter value. The counter 25 serves to count the number of track traversings.

The count value of the counter 25 is converted into a command velocity value by a command velocity generator 27. The command velocity value output from the command velocity generator 27 is converted into an analog value by a D/A converter 28, which is inputted to the other input terminal of the differential circuit 23, and provide a target value of the above velocity control. Therefore, if the switch 24 is turned on, the velocity control is made to shift the light beam at the velocity equal to the command velocity value outputted from the command velocity generator 27.

The count value of the counter 25 is also sent to coincidence detection circuits 29, 30 and 35. The coincidence detection circuits 29, 30 and 35 compare the count value of the counter 25 with their predetermined values respectively and to send, to a microcomputer abridged as μ-com) 26, a low level signal if they coincide and send a high level signal if they do not coincide.

Also inputted to the μ-com 26 is the velocity value output from the velocity calculation circuit 21 so that the μ-com 26 can read in the present velocity of the light beam. Further, the μ-com 26, which is connected with a D/A converter 33 the output of which is sent to the adder 16 through a switch 34, can drive the transfer table 3.

The operation of the switches 15, 24 and 34, the control signals for which are outputted from the μ-com 26, is controlled by the μ-com 26.

Figure 3:
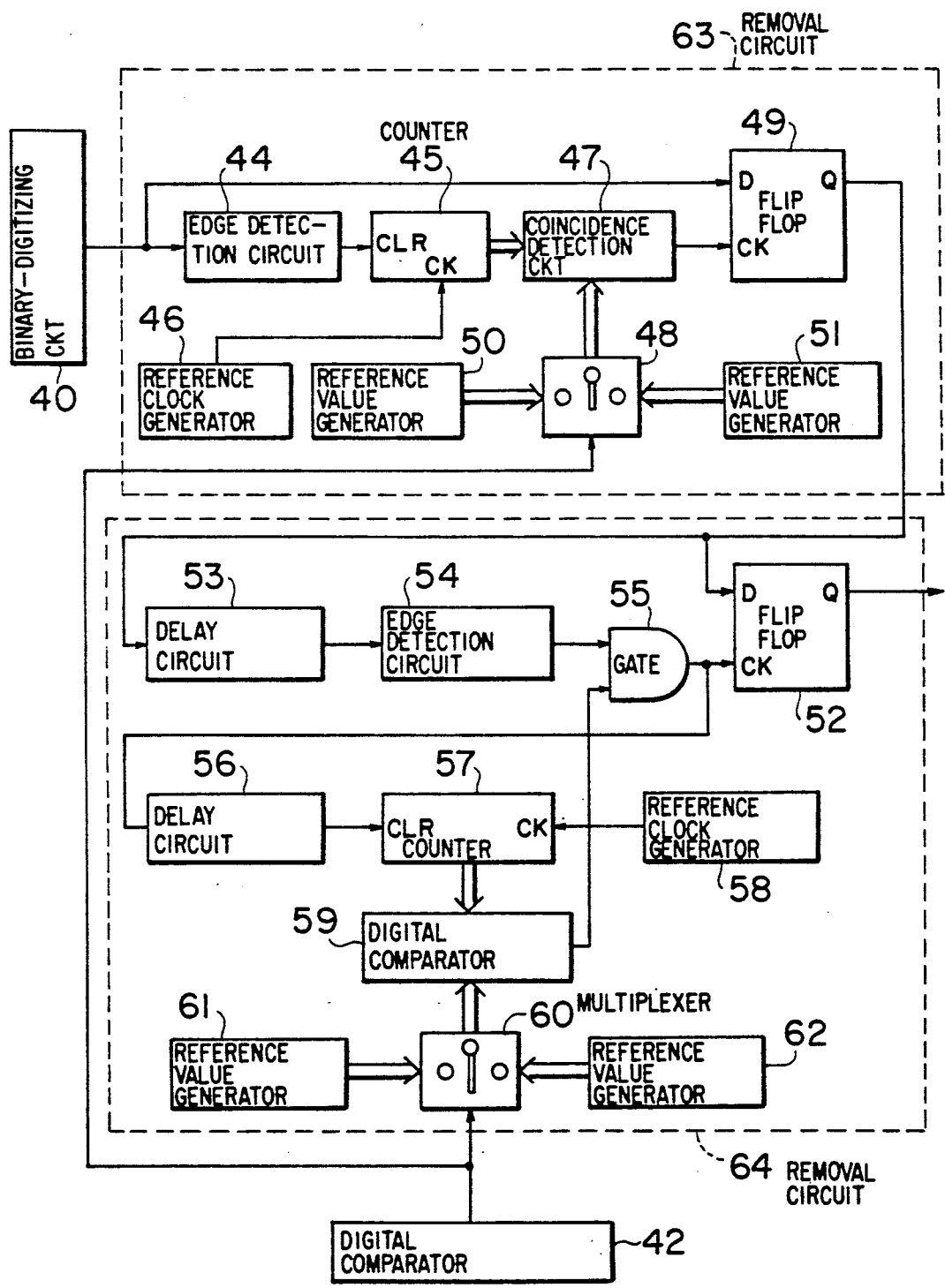
FIG. 3 is a detailed block diagram of a noise reduction circuit in FIG. 1.

Prior to detailed explanation of the operation of track search, the arrangement and operation of the noise reduction circuit 41 will be explained. FIG. 3 shows the arrangement of the noise reduction circuit 41 which is composed of removal circuits 63 and 64 encircled by dotted lines. Therefore, with respect to the arrangement and operation of the noise reduction circuit 41, those of the removal circuit 63 will be first explained and thereafter those of the removal circuit 64 will be explained.

In FIG. 3, a binary signal output from a binary-digitizing circuit 40 is inputted to an edge detection circuit 44 in the removal circuit 63. An output from the edge detection circuit 44 is connected to a CLR terminal for clearing the count value of a counter 45. Also connected with the CK terminal, which is a clock input terminal of the counter 45, is an output from a reference clock generator 46. The counter 45 serves to count the period of the signal output from the edge detection circuit 44. The count value of the counter 45 is inputted to a coincidence detection circuit 47. The coincidence detection circuit 47 serves to compare the count value of the counter 45 with a reference value output from a multiplexer 48 and to produce a pulse if they coincide. An output from the coincidence detection circuit 47 is inputted to the CK terminal which is a clock input terminal of a flip-flop 49. Inputted to the D terminal which is a data terminal of the flip-flop 49 is the binary signal output from the binary-digitizing circuit 40. Thus, the flip-flop 49 latches the output level from the binary-digitizing circuit 40 when the output from the coincidence detection circuit 47 has been produced and outputs it from the Q terminal which is a non-inverted output terminal of the flip-flop 49. The output from the flip-flop 49 forms an output from the removal circuit 63. On the other hand, connected with the multiplexer 48 are reference value generators 50 and 51. It should be noted that the reference value output from the reference value generator 50 is set to be larger than that output from the reference value generator 51. The multiplexer 48 outputs, to the coincidence detection circuit 47, the reference value output from the reference value generator 50 if the command signal output from the digital comparator 42 is at a low level and the reference value output from the reference value generator 51 if it is at a high level. It is assumed that the reference value output from the reference generator 50 is set at 2 and that from the reference value generator 51 is set at 3.

Figure 4:
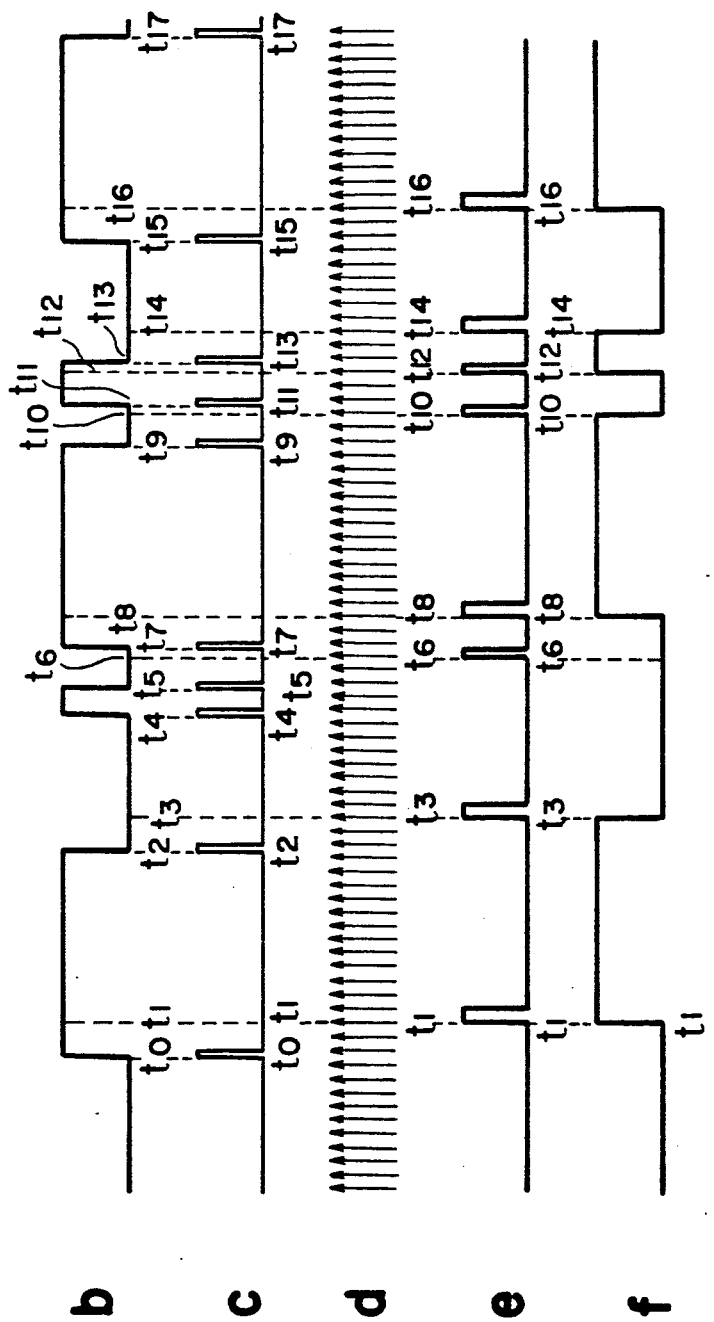
FIGS. 4(a) to 4(f) are timing chart of the operation of the reduction circuit 63 in FIG. 3.

The operation of the removal circuit 63 will be explained with reference to the timing chart of FIGS. 4a to 4f. It is assumed in the following explanation that the command signal output from the digital comparator 42 is at a low level; and therefore the reference value output from the multiplexer 48 is 3. FIG. 4a shows the output signal from the differential generator 12, i.e. tracking error signal; FIG. 4b shows the binary signal output from the binary-digitizing circuit 40; FIG. 4c shows the output signal from the edge detection circuit 44 in FIG. 3; FIG. 4d shows the output signal from the reference clock generator 46; FIG. 4e shows the output signal from the coincidence detection circuit 47; and FIG. 4f shows the output signal from the flip-flop 49, which is an output from the removal circuit 63.

FIG. 4a shows the tracking error signal output from the differential amplifier 12 when the light beam traverses the tracks at a certain velocity. In FIG. 4a, variations in time domains K1, K2 and K3 are due to the represent the mixing of noise due to disk flaws, etc. but do not correspond to the positional relationships between the light beam and the tracks.

The output (FIG. 4b) from the binary-digitizing circuit 40 for binary-digitizing the tracking error signal is subjected to changes due to the noises in the time domains K1 and K2, thus producing the changes in amplitude (level). In FIG. 4b, the level changes due to noises correspond to the portions of the high level from t4 to t5 and of that from t11 to t13.

The edge detection circuit 44 is adapted to detect the rising and falling edges of the binary signal output from the binary-digitizing circuit 40 to produce pulses. The output (FIG. 4c) from the edge detection circuit 44 is also subjected to changes due to the noises in the time domains K1 and K2. In FIG. 4c, the pulses at t4, t5, t11 and t13 are attribute to the noises, respectively. The noise in the time domain K3 provides so small a change in the amplitude of the tracking error signal that does not reach the threshold level of the binary-digitizing circuit 40, and therefore does not affect the outputs from the binary-digitizing circuit 40 and the edge detection circuit 44.

In order to explain in detail the operation of the removal circuit 63, the explanation will be made paying attention to the pulse output at t0 from the edge detection circuit 44. When at the time t0, a pulse is inputted to the CLR terminal of the counter 45, the counter 45 clears the count value to start the counting of clocks inputted to the CK terminal thereof. The counter 45, which is an up-counter, is adapted to send the counter value to the coincidence detection circuit 47. As mentioned above, the reference value '3' has been inputted to the coincidence detection circuit 47 from the multiplexer 48. Therefore, at the time t1 after three clocks from t0, as shown in FIG. 4e, the coincidence detection circuit 47 outputs a pulse to the flip-flop 49. The flip-flop 49, when received the pulse from the coincidence detection circuit 47, latches the high level of the binary signal inputted to the D terminal and outputs it. This operation is shown in FIG. 4f.

On the other hand, when with respect to the pulse at t4 as shown in FIG. 4c, the subsequent pulse at t5 is inputted before the count value of the counter 45 becomes 3, and thus the count value of the counters 45 is cleared. Therefore, the coincidence detection circuit 47 does not produce a pulse after three clocks from t4. As a result, the noise in the time domain K1 is removed, and the flip-flop 49 produces an output free from the binary signal corresponding to the noise. On the contrary, the pulses at t11 and t13 due to the noise in the time domain K2 have an interval therebetween which is longer than three clocks. Therefore, the noise in the time domain K2 is not removed and the flip-flop 49 produces an output with the binary signal corresponding to the noise as it is. As understood from the above description, the removal circuit 63 is adapted to pass the binary signal output from the binary-digitizing circuit 40 if its continuous high level or low level period is longer than a predetermined period $x_1$ and remove it if the period is shorter. Now $x_1$ can be expressed by $$x_1 \times j_1 \times z_1 = 3 \times z_1 \tag{4}$$

where $z_1$ is the period of clocks generated from the reference clock generator 46, and $j_1$ is the reference value produced from the reference value generator 50.

The above description is directed the case where the command signal from the digital comparator 42 is at a low level (i.e. the reference value from the multiplexer 48 is '3'). On the other hand, in the case where the command signal from the digital comparator 42 is at a high level (the reference value is '2'), the removal circuit 63 serves to pass the binary signal output from the binary-digitizing circuit 40 if its continuous high level or low level period is longer than a predetermined period $x_2$, and remove it if the period is shorter. Now, $x_2$ can be expressed by $$x_2 = j_2 \times z_2 = 2 \times z_1 < x_1 \tag{5}$$

where $j_2$ is the reference value output from the reference value generator 51.

Therefore, in accordance with the command signal output from the digital comparator 42, the removal circuit 63 can change its removal characteristic. Specifically, the removal circuit 63 serves to remove noise with a lower frequency component when the command signal output from the digital comparator is at a low level than when it is at a high level.

It should be noted that half of the period of the tracking error signal output from the differential amplifier 12 must be larger than $x_1$ and $x_2$ above, since if not, the tracking error signal will be wholly removed.

Explanation will be given for the arrangement and operation of the removal circuit 64. The output from the removal circuit 63 is inputted to the D terminal of a flip-flop 52 and a delay circuit 53. An output from the delay circuit 53 is inputted to one terminal of a gate 55 through an edge detection circuit 54. An output from the gate 55 is inputted to the ck terminal of the flip-flop 52 and a delay circuit 56. An output from the delay circuit 56 is inputted to the CLR terminal of a counter 57. Inputted to the CK terminal of the counter 57 are clocks from a reference clock generator 58. The count value of the counter 57 is compared with the reference value output from a multiplexer 60 by a digital comparator 59. An output from the digital comparator 59 is inputted to another input terminal of the gate 55. Connected with the multiplexer 60 are reference value generators 61 and 62. It should be noted that the reference value output from the reference value generator 61 is set to be larger than that from the reference value generator 62. The multiplexer 60 sends, to the digital comparator 59, the reference value output from the reference value generator 61 when the command signal from the digital comparator 42 is at a low level, and the reference value output from the reference value generator 62 when it is at a high level. The output from the flip-flop 52 provides an output signal from the removal circuit 64. Also, the output from the removal circuit 64 provides an output from the noise reduction circuit 41 in FIG. 1.

The operation of the removal circuit 64 will be explained with reference to the timing chart of FIGS. 5a to 5g. It is assumed in the following explanation that the command signal output from the digital comparator 42 is at a low level.

FIG. 5a shows the output signal from the removal circuit 63; FIG. 5b shows the output signal from the delay circuit 53; FIG. 5c shows the output signal from the edge detection circuit 54; FIG. 5d shows the output signal from the gate 55; FIG. 5e shows the output signal from the delay circuit 56; FIG. 5f shows the output signal from the digital comparator 59; and FIG. 5g shows the output signal from the flip-flop 52, which is an output from the removal circuit 64.

The waveform shown in FIG. 5a is the same as that shown in FIG. 4f in which the binary signal corresponding to the noise in the time domain K2 has not been removed by the removal circuit 63 but left as it is. The delay circuit 53 delays the output from the removal circuit 63 by a predetermined period d1. The waveform thus formed is shown in FIG. 5b. The edge detection circuit 54 serves to detect the rising and falling edges of the output signal from the delay circuit 53 to output pulses to the gate 55. The pulses due to the noise in the time domain K2 occur at the times t26 and t27 in FIG. 5c. The gate 55 calculates a logical product of the respective outputs of the digital comparator 59 and the edge detection circuit 54. The digital comparator 54, although explained in detail later, is adapted to output a low level during a predetermined period $y_1$ after a pulse has been outputted from the edge detection circuit 54, and output a high level during the other period. Therefore, the gate 55 operates to mask all the pulses produced during the period $y_1$ after a certain pulse has been outputted from the edge detection circuit 54, and operates to pass a pulse again after the lapse of the period $y_1$. The output from the gate 55 is also inputted to the CK terminal of the flip-flop 52. The flip-flop 52 latches the output from the removal circuit 63 at the time when pulses have been applied thereto and outputs it as an output from the removal circuit 64.

The operation of the gate 55 will be explained paying attention to a pulse at t18 in FIGS. 5c to 5g. Now it is assumed that during the period preceding to $t_{18}$, a pulse has not been outputted from the edge detection circuit 54 and the output from the digital comparator 59 is at a high level at $t_{18}$.

The gate 55 passes the pulse at $t_{18}$ and sends it to the delay circuit 56, which delays the input signal by a predetermined period $d_2$. In accordance with the pulse at $t_{18}$, the delay circuit 56 sends the pulse to the counter 57 at $t_{19}$ delayed from $t_{18}$ by the predetermined period $d_2$.

The counter 57 clears the counted value when a pulse is inputted from the delay circuit 56. The counter 57, which is an up-counter, serves to count clocks generated by the reference clock generator 58 and send the counted value to the digital comparator 59.

The digital comparator 59 compares the count value of the counter 57 with the reference value output from the multiplexer 60. The digital comparator 59 generates a low level if the former is smaller than the latter and a high level if not. Therefore, simultaneously when a pulse is generated by the delay circuit 56 (the count value of the counter 57 is cleared as mentioned above) at $t_{19}$, the output from the digital comparator 59 becomes a low level. After the lapse of the predetermined period $y_1$, it returns to a high level. The multiplexer 60 produces the reference value output from the reference value generator 61 since the command signal outputted from the digital comparator 42 is at a low level as previously mentioned. Thus, the predetermined period $y_1$ can be expressed by $$y_1 = j_3 \times z_2 \tag{6}$$

where $z_2$ is the period of clocks outputted from the reference clock generator 58 and $j_3$ is the reference value outputted from the reference value generator 61.

Additionally, when the gate 55 produces a pulse at $t_{18}$, the flip-flop 52 latches to output its high level which is an output value from the removal circuit 63.

Figure 5:
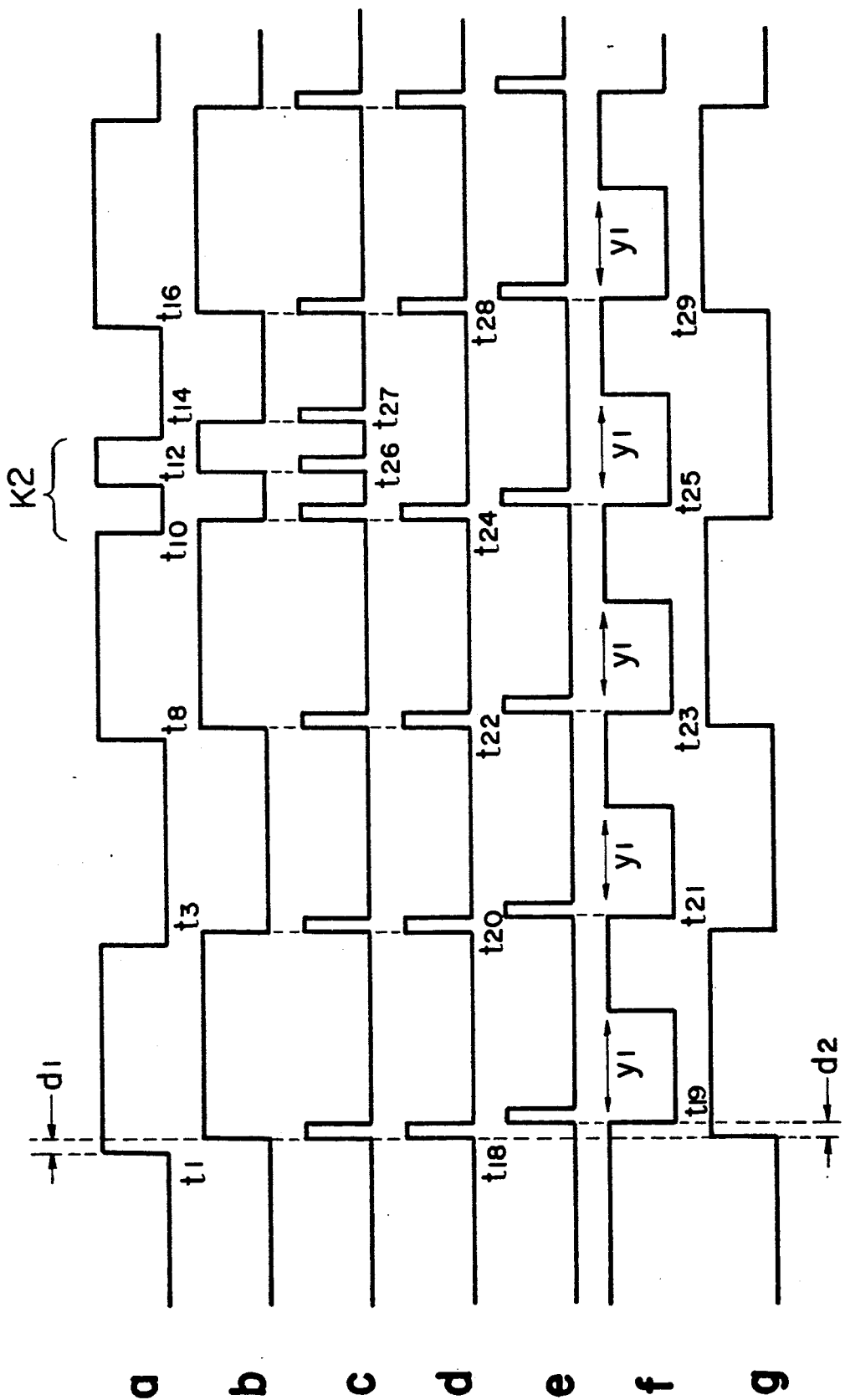
FIGS. 5(a) to 5(g) are timing charts of the operation of a reduction circuit in FIG. 3.

Explanation will be given for the operation of the gate 55 for the output pulses from the edge detection circuit 54 at $t_{24}$, $t_{26}$ and $t_{27}$ in FIG. 5c which are attributed the noise in the time domain K2. As shown in FIG. 5, the relation between $t_{24}$ and $t_{23}$ when a pulse immediately previous to the pulse at $t_{24}$ is produced by the delay circuit 54 is expressed by $$t_{24} - t_{23} > y_1 \tag{7}$$

Then, the output form the digital comparator 59 at $t_{24}$ is at a high level. Therefore, the gate 55 produces a pulse at $t_{24}$, and the flip-flop 52 latches the low level which is an output value from the removal circuit 63 at this time and outputs it. At $t_{25}$ after the predetermined period $d_2$ from $t_{24}$, the delay circuit 56 outputs a pulse whereby the count value of the counter 57 is cleared, so that the output from the digital comparator 59 becomes a low level. At $t_{26}$ and $t_{27}$, the edge detection circuit 54 produces pulses due to the noise in the time domain K2. However, the predetermined period $y_1$ does not still elapse, so that the output from the digital comparator 59 is still at a low level. Therefore, the gate 55 does not produce a pulse. As a result, the flip-flop 52 does not latch the output value from the removal circuit 63 and thus the binary signal free from the noise (the binary signal corresponding thereto) is outputted from the removal circuit 64.

As mentioned above, if the command signal outputted from the digital comparator 42 is at a low level, the removal circuit 64 masks the input signal during the period from the rising and falling edges to the predetermined time $y_1$. On the other hand, if it is a high level, the multiplexer 60 supplies the reference value output from the reference value generator 62 to the digital comparator 59. Then, as understood from the above description, the removal circuit 64 will mask the input signal during the period from the rising and falling edges to a predetermined time $y_2$ represented by $$y_2 = j_4 \times z_2 < y_1 \tag{8}$$

where $z_2$ is the period of clocks outputted the reference clock generator circuit 58, and $j_4$ is the reference value outputted from the reference value generator 62.

Thus, it will be apparent that the noise removal characteristic of the removal circuit 64 is determined in accordance with the predetermined times $y_1$ and $y_2$. Therefore, it can be changed by switching between the predetermined times $y_1$ and $y_2$. Specifically, the removal circuit 64 serves to remove even noise with a lower frequency component when the command signal output from the digital comparator 42 is at the low level than when it is the high level.

It should be noted that half of the period of tracking error signal output from the differential amplifier 12 must be larger than $y_1$ and $y_2$ above, since if not, the tracking error signal will be wholly removed by the removal circuit 64.

As mentioned above, by the foregoing arrangement of the removal circuits 63 and 64, the noise reduction circuit 41 can change its noise reduction characteristic in two stages in accordance with the command signal outputted from the digital comparator 42. Specifically, the noise reduction circuit 41 operates to remove noise with a lower frequency component the above command signal is at a low level than when it is at a high level.

The reason why the noise reduction circuit 41 is composed of two removal circuits 63 and 64 above will be explained. As mentioned in connection with FIGS. 4a to 4f, the removal circuit 63, if the continuous high or low level period is shorter than the predetermined period $x_1$ or $x_2$ which is decided by the clocks generated by the reference clock generator 46 and the reference value from the reference value generator 50 or 51, judges it to be noise and removes it. Therefore, in the case where a large number of the level changes are caused due to noises in the signal from the binary-digitizing circuit 40 it is necessary to take the predetermined period $x_1$ or $x_2$ to be of sufficiently shorter than half of the period of the tracking signal from the differential amplifier 12. If they are not so taken, the continuous high or low level periods in half of the tracking error signal will be all shorter than $x_1$ or $x_2$, and the tracking error signal itself may probably disappear. On the other hand, in the neighborhood of the zero-crossing of the tracking error signal from the differential amplifier 12, the output of the binary-digitizing circuit 40 includes much chattering due to device noise so that the noise can not be completely removed only by the removal circuit 63. Namely, the removal circuit 64 is provided to remove the noise in the neighborhood of the zero-crossing of the tracking error signal.

Figure 6:
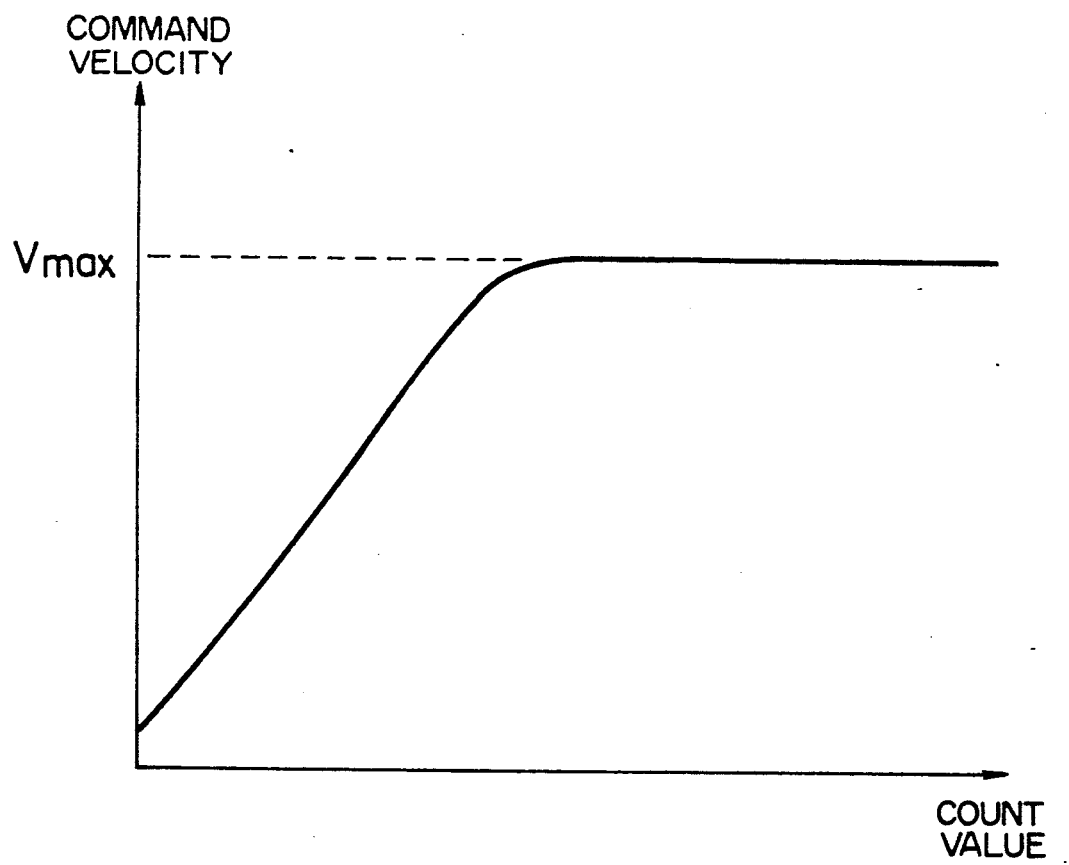
FIG. 6 is a view for explaining the relationship between the count value of a counter and the command velocity.

The operation of track search will be explained below in connection with FIG. 1. It is assumed that prior to the track search, the switch 15 has been 'on' while the switches 24 and 34 have been 'off' so that the tracking control has been enabled and the light beam has been following a predetermined track. Now when a target track address is inputted to the μ-com 26 prior to the track search, the μ-com 26 reads or fetches the address of the track search starting track where the light beam is located, although FIG. 1 does not show necessary circuit blocks for the address reading operation. Also the μ-com 26 presets a track difference from the track search starting track to the target track in the counter 25. When the switch 15 is turned off and the switch 24 is turned on in accordance with the orders from the μ-com 26, the light beam starts to move toward the target track, thereby starting the search operation. The counter 25, during the track search operation, reduces the counted value by 1 each when the track traversing signal is inputted from the edge detection circuit 43. Thus, the count value of the counter 25 during the track search represents the present position of the light beam towards the target track. The command velocity generator 27 is a ROM (read only memory) the address line of which is connected with the output line of the counter 25 and the data line of which is connected, as an output, with the D/A converter 28. Stored in the each address of ROM corresponding to each count value of the counter 25, i.e. the present position of the light beam is the command velocity value of the light beam at that position in digital value. Thus, during the track search, the command velocity value corresponding to the present position of the light beam will be inputted to the D/A converter 28. In order to smoothly carry out the track search the ROM stores data to provide a larger command velocity as the count value of the counter 25 is larger, as shown in FIG. 6. In order to prevent the adverse affect from the limitation to the dynamic range of the velocity control, the command velocity is fixed to $V_{max}$ when the counter count value exceeds a prescribed value. The output signal from the command velocity generator 27 is converted by D/A converter 28 into an analog value which is supplied to the differential circuit 23 which provides a velocity command signal for the velocity control. As a result, by the velocity control, the light beam moves at a velocity substantially equal to the command velocity. For the velocity control, a larger velocity command signal is provided as the light beam is farther from the target track, and a smaller velocity command signal is provided as the light beam is nearer to the target track. Thus, as the light beam moves towards the target track after the start of track search, the count value of the counter 25 is reduced and also the light beam approaches toward the target track at the correspondingly reducing velocity.

During the track search, the measured value in the timer 20 is compared with the reference value incorporated in the digital comparator 42 by the digital comparator 42. When the velocity of the light beam is low immediately after the start of track search, the relationship between the measured value DT in the timer 20 and the reference value DS in the digital comparator 42 is $$DT > DS \tag{9}$$

Then, the command signal from the digital comparator 42 is at a low level. Therefore, the noise reduction circuit 41 operates to remove noise with a lower frequency component. When the velocity of the light beam is increased, thus provided the relation $$DT \leq DS \tag{10}$$

the command signal output from the digital comparator 42 is at a high level. Then, as mentioned above, the noise reduction circuit 41 changes the noise reduction characteristic so as to remove noise with a higher frequency component. Thereafter, when the light beam approaches to the target track and in accordance with the velocity command signal output from the command velocity generator 27 the velocity of the light beam is reduced to provide the relation $$DT > DS \tag{11}$$

the command signal output from the digital comparator 42 is at a low level. Then, the noise reduction circuit 41 operates to remove noise with a lower frequency component again. Now, the reference value DS incorporated in the digital comparator 42 is set to satisfy, for the predetermined periods in the removal circuits 63 and 64, $x_1$, $x_2$; $y_1$, $y_2$ and the command velocity $V_{max}$, the following relations (12) and (13)

$$\left. \begin{array}{l} DS/2 > x_1 \\ P/2 \times v_{max} > x_2 \end{array} \right\} \tag{12}$$

$$\left. \begin{array}{l} DS/2 > y_1 \\ P/2 \times V_{max} > y_2 \end{array} \right\} \tag{13}$$

where P is a track pitch and the terms at the lower stages of the above two relations ($P/2 \times V_{max}$) is the time equal to half of the period of the tracking error signal output from the differential amplifier 12 when the light beam traverses a track at the command velocity $V_{max}$.

By such an arrangement, even if the velocity of the light beam is greatly changed during the track search so that the period of the tracking error signal output from the differential amplifier 12, noise can be removed without removing the tracking error signal itself.

Meanwhile, the coincidence detection circuit 35 is adapted so that it supplies a low level to the μ-com 26 when the count value of the counter 25 becomes 20, and it supplies a high level thereto when it is the other value. This means that when the output from the coincidence detection circuit 35 becomes the low level, the light beam has reached the track 20 tracks before the target track. The μ-com 26, immediately after the signal output from the coincidence detection circuit 35 becomes the low level, turns the switch 24 off to disable the velocity control and also read in the velocity value calculated by the velocity calculation circuit 21. The μ-com 26 calculates the digital value $H_2$ with a polarity substantially satisfying equation (14) on the basis of the velocity value output from the velocity calculation circuit 21. And the μ-com 26 sent the value $H_2$ to the D/A converter 33, thus placing the switch 34 'on' during the period of W2.

$$DV_{ref}(20) - DV = G_{da} \times G_{add} \times G_{dr} \times F \times H_2 \times W2/M \tag{14}$$

where
$DV_{ref}(20)$: command velocity at a track preceding by 20 tracks before the target track
$G_{da}$: conversion gain of the C/A converter 33
$G_{add}$: gain of the adder 16
$G_{dr}$: gain of the driving circuit 17
F: thrust constant of the voice coil motor 4
M: transfer mass
DV: velocity value output from the velocity calculation circuit 21

The transfer mass is the sum of the entire mass of the components such as the focusing lens 1, the reflecting mirror 2, etc. which are placed on the transfer table 3, and the mass of the transfer table itself.

The output from the D/A converter 33 is supplied to the voice coil motor 4 through the switch 34, the adder 16, and the driving circuit 17, so that the light beam is driven by the pulses with the peak value (amplitude) corresponding to the digital value $H_2$ with the polarity output from μ-com 26 and the pulse width equal to the period W2 when the switch 34 is 'on'.

The polarity of the digital value $H_2$ with the polarity output from the μ-com 26 is set so as to decrease the velocity of the light beam if the velocity value output from the velocity calculation circuit 21 is larger than $DV_{ref}(20)$. More specifically, if the velocity of the light beam 20 tracks before the target track is higher than the command velocity $DV_{ref}(20)$ as a reference, the light beam is adapted to be driven by the deceleration pulses having energy enough to substantially decelerate it to the command velocity $DV_{ref}(20)$. On the contrary, if the former is lower than the latter, the light beam is adapted to be driven by the acceleration pulses having energy enough to substantially accelerate it to the command velocity $DV_{ref}(20)$.

After the period W2 when the switch is 'on' elapses, the switch 34 is turned off again and the switch 24 is turned on again so that the velocity control is activated again. Then, the speed of the light beam is substantially equal to the command velocity $DV_{ref}(20)$ at the track preceding by 20 tracks to the target track. Thereafter, the light beam will move toward the target track at the velocity substantially equal to the command velocity outputted from the command velocity generator 27 by the velocity control.

Meanwhile, the coincidence detection circuit, 29 is adapted so that it supplies a low level to the μ-com 26 when the count value of the counter 25 becomes 2, and it supplies a high level thereto when it is the other value.

This means that when the output from the coincidence detection circuit 29 becomes the low level, the light beam has reached the track 2 (two) tracks before the target track. The μ-com 26, immediately after the signal output from the coincidence detection circuit 29 becomes the low level, turns the switch 24 off to disable the velocity control and also read in the velocity value calculated by the velocity calculation circuit 21. The μ-com 26 calculates the digital value $H_1$ with a polarity substantially satisfying equation (15) on the basis of the velocity value output from the velocity calculation circuit 21. The μ-com 26 sends the value $H_1$ to the D/A converter 33, thus placing the switch 34 'on' during the period of W1.

$$DV_{ref} - DV = G_{da} \times G_{add} \times G_{dr} \times F \times H_1 \times W1/M \quad (15)$$

where
- $DV_{ref}$: reference pull-in velocity
- $G_{da}$: conversion gain of the D/A converter 33
- $G_{add}$: gain of the adder 16
- $G_{dr}$: gain of the driving circuit 17
- F: thrust constant of the voice coil motor 4
- DV: velocity value output from the velocity calculation circuit 21

Then, the light beam is driven by the pulses with the peak value (amplitude) corresponding to the digital value $H_1$ with the polarity output from μ-com 26 and the pulse width equal to the period W1 when the switch 34 is 'on'. The polarity of the digital value $H_1$ with the polarity output from the μ-com 26 is set so as to decrease the velocity of the light beam if the velocity value output from the velocity calculation circuit 21 is larger than $DV_{ref}$. More specifically, if the velocity of the light beam 2 (two) tracks before the target track is higher than the command velocity $DV_{ref}$ as a reference, the light beam is adapted to be driven by the deceleration pulse having energy enough to substantially decelerate it to the command velocity $DV_{ref}$. On the contrary, if the former is lower than the latter, the light beam is adapted to be driven by the acceleration pulses having energy enough to substantially accelerate it to the command velocity $DV_{ref}$.

After the period W1 when the switch 34 is 'on' elapses, the switch 34 is turned off again. Then, the velocity of the light beam of is substantially equal to the reference pull-in velocity $DV_{ref}$ at the track 2 tracks before the target track. Thereafter, the light beam moves toward the target track through inertia.

Meanwhile, the coincidence detection circuit 30 is adapted so that it supplies a low level to the μ-com 26 when the count value of the counter 25 becomes 0, and it supplies a high level thereto when it is the other value. When the light beam reaches the target track and hence the signal output from the coincidence detection circuit 30 becomes the low level the μ-com 26 turns on the switch 15 without delay to enable the tracking control thereby completing the track search.

By means of the above construction, in the case when the eccentricity involved in the disk is large, or vibration or shock is externally applied to the apparatus, and hence control error in the velocity control could become large and the tracking pull-in speed also become too high, by applying suitable deceleration pulses thereby to restrict the increase of tracking pull-in speed, it is possible to carry out the stabilized track search without failure of the pull-in into a target track. On the other hand, in the case where the tracking speed becomes too low, by applying suitable acceleration pulses, it is possible to reduce the increase of the time required for the track search.

Moreover, in the case where noise due to flaws or the like on a disk is included in the tracking error signal, the noise can be effectively removed and hence the acceleration or deceleration pulses can be suitably applied, so that the reliability of the track search can be improved.

A feature of the embodiment of the present invention resides in that a difference affected by disturbance between the actual tracking pull-in speed and the reference pull-in speed is not subjected to the limitation of the band and gain of the velocity control.

In this embodiment of the present invention, after the light beam has been driven by the acceleration or deceleration pulses corresponding to the velocity at the track 20 tracks before the target track. And the switch 24 is turned on to enable the velocity control again. However, with the switch 24 being off, the light beam may be moved to the track 2 tracks before the target track by inertia thereby to provide the same effect. Moreover, in the above embodiment, the switch 24 remains off after the light beam has been driven by the acceleration or deceleration pulses corresponding to the velocity at the track 2 tracks before the target track. However, the switch 24 may be turned on again and thereafter when the output signal from the coincidence detection circuit 30 becomes a low level, it may be turned off, thereby providing the same effect.

Furthermore, in the above embodiment, the coincidence detection circuits 29 and 35 are adapted so that they detect that the counted value has reached 2 and 20 and 2 respectively. However, it is apparent that like operation and effects can be achieved by selecting them as N1 and N2 (N1 and N2 are positive integers, and N2>N1), respectively. In this case, the signal output from the coincidence detection circuit 29 is at a low level when the light beam is located at the track N1 track(s) before the target track whereas it is at a high level in the other time. The signal output from the coincidence detection circuit 35 is at a low level when the light beam is located at the track N2 tracks before the target track whereas it is at a high level in the other time.

Further, in the above embodiment, both of the peak value H1 and the pulse width W1 of the acceleration or deceleration pulse applied in accordance with the light beam velocity at the track N1 track(s) before the target track is set by the $\mu$-cm 26. However, with one of them being fixed, only the other may be set by the $\mu$-cm 26. Likewise, in the above embodiment, both of the peak value H2 and the pulse width W2 of the acceleration or deceleration pulses applied in accordance with the light beam velocity at the track N2 tracks before the target track is set by the $\mu$-cm 26. However, with one of them being fixed, only the other may be set by the $\mu$-cm 26.

It will be apparent that although the acceleration or deceleration pulses have a rectangular shape in the above embodiment, they may have the other shape such as a triangular or trapezoidal shape.

Although in this embodiment, the number of times of applying the acceleration or deceleration pulses is set twice within one track search operation, it may be N3 (N3 is an integer of 1 or more), thereby providing the same or further improved effect.

Although the noise reduction circuit 41 is composed of two removal circuits (removal circuits 63 and 64) in the above embodiment, either one can provide the same kind of effect although the effect is reduced. Further, although the noise reduction characteristic in the removal circuits 63 and 64 are changed in two stages in the above embodiment, it may be changed in N4 stages (N4 is an integer of 3 or more) whereby the effect can be further enhanced. In this case, N4−1 reference values must be set in the digital comparator 42 for predetermined periods $x_1, x_2, x_3, \ldots, x_{N4}$ ($x_1 > x_2 > x_2 > \ldots > x_{N4}$) corresponding to the N4 stages in the noise reduction characteristic in the removal circuit 63. The reference values $DS_1, DS_2, \ldots, DS_{N4-1}$ in the digital comparator 42 corresponding to the changes between $x_1$ and $x_2$, between $x_2$ and $x_3, \ldots, x_{N4-1}$ and $x_{N4}$ must satisfy the following relation (16).

$$\left. \begin{array}{l} DS_1/2 > x_1 \\ DS_2/2 > x_2 \\ (DS_{N4-1})/2 > x_{N4-1} \\ P/(2 \times V_{max}) > x_{N4} \end{array} \right\} \quad (16)$$

For predetermined periods $Y_1, y_2, y_3, \ldots y_{N4}$ ($y_1 > Y_2 Y_2 > \ldots > y_{N4}$) corresponding to the N4 stages in the noise reduction characteristic in the removal circuit 64, the reference values $DS_1, DS_2, \ldots DS_{N4-1}$ must meet the following relation (17)

$$\left. \begin{array}{l} DS_1 > y_1 \\ DS_2 > y_2 \\ (DS_{N4-1})/2 > y_{N4-1} \\ P/(2 \times v_{max}) > y_{N4} \end{array} \right\} \quad (17)$$

In relations (17) and (18), P denotes a track pitch and $V_{max}$ denotes the maximum command velocity value output from the command velocity generator 27.

It is assumed in this embodiment that the edge detection circuit 43 detects that the light beam has traversed the center of each track as shown in FIG. 2d. However, it is apparent that the same effect can be obtained also by constructing the edge detection circuit 43 so that it detects that the light beam has traversed the center of each track and the mid-point therebetween as shown in FIG. 2e. In this case, the velocity calculation circuit 21 calculates the velocity value DV of the light beam from the measured value in the timer 20 in accordance with the following equation (18)

$$DV = P/(DT \times 2) \quad (18)$$

where P is track pitch between the tracks and DT denotes the measured value in the time 20. Further, prior to the track search, twice the difference between the track search starting track and the target track is preset in the counter 25 by the $\mu$-com 26. Therefore, the position where the deceleration or acceleration pulses are to be applied can be specified with units of 0.5 track for the number of track before the target tack.

In this embodiment, the light beam is moved activating the velocity control until the predetermined position before the target track where the acceleration or deceleration pulses are applied. However, the present invention is not limited to the movement of the light beam by the velocity control. This is because the present invention is related to the period when the light beam moves from the predetermined position before the target track and the target track but does not subject to any limitation relative to the way of moving the light beam to the above predetermined position. Therefore, the present invention is sufficiently useful, for example, also when driving pulses are applied in starting the track search to accelerate the light beam towards the target and thereafter the light beam is moved to the predetermined position by inertia.

What is claimed is:

1. A track search apparatus for moving a signal conversion means for reproducing signals recorded on a recording medium toward a selected target track to position it at said target track, said apparatus comprising:
   shifting means for shifting said conversion means to traverse tracks toward the target track;
   velocity detection means, for detecting the shifting velocity of said conversion means and providing a velocity signal representing said shifting velocity;
   velocity control means, operatively connected to said shifting means and said velocity detection means, for controlling the shifting velocity of said conversion means in order to move said conversion means toward the target track by driving said shifting means in accordance with the velocity signal from said velocity detection means;
   position detection means for detecting that said conversion means has arrived at a predetermined position in front of the target track and outputting a position arrival signal indicating arrival of the conversion means at said predetermined position; and
   pulse generation means, operatively connected to said shifting means, said velocity detection means, said velocity control means and said position detection means, for disabling said velocity control means and applying a driving pulse to said shifting means according to said velocity signal from said velocity detection means in response to said position arrival signal from said position detection means, said drive pulse being applied for a selected one of acceleration and deceleration of said conversion means toward said target track according to said velocity signal.

2. A track search apparatus according to claim 1, wherein said driving pule has substantially triangular shape.

3. A track search apparatus according to claim 2, wherein said driving pulse has a width which is changed in accordance with the velocity signal from said velocity detection means.

4. A track search apparatus according to claim 2, wherein said driving pulse has a peak value which is changed in accordance with the velocity signal from said velocity detection means.

5. A track search apparatus for moving a signal conversion means for reproducing signals recorded on a recording medium toward a selected target track to position it at said target track, said apparatus comprising:
shifting means for shifting said conversion means to traverse tracks toward the target track;
track traversing detection means, operatively connected to the conversion means, for detecting each track traversing operation of said conversion means and outputting a track traverse signal each time said conversion means traverses a track;
velocity detection means, connected to said traversing detection means, for detecting a shifting velocity of said conversion means based on a period of said track traversing signal and outputting a signal representing said shifting velocity;
velocity control means, operatively connected to said shifting means and said velocity detection means, for controlling the shifting velocity of said conversion means in order to move said conversion means toward the target track by driving said shifting means in accordance with the velocity signal from said velocity detection means;
position detection means, connected to said traversing detection means, for detecting that said conversion means has arrived at a predetermined position in front of the target track by counting track traverse signals output from said track traversing detection means and outputting a position arrival signal representing arrival of said conversion means at said predetermined position; and
pulse generation means, operatively connected to said shifting means, said velocity detection means, said velocity control means and said position detection means, for disabling said velocity control means and applying a driving pulse to said shifting means according to a velocity signal from said velocity detection means in response to said position arrival signal from said position detection means, said drive pulse being applied for a selected one of acceleration and deceleration of said conversion means toward said target track according to said velocity signal.

6. A track search apparatus according to claim 5, wherein said driving pulse has a substantially triangular shape.

7. A track search apparatus according to claim 6, wherein said driving pulse has a width which is changed in accordance with the velocity signal from said velocity detection means.

8. A track search apparatus according to claim 6, wherein said driving pulse has a peak value which is changed in accordance with the velocity signal from said velocity detection means.

9. A track search apparatus according to claim 5, wherein said track traversing detection means comprises:
a deviation detection circuit for detecting a deviation between the reproduction position of said conversion means on the recording medium and a track and outputting a deviation signal representing said deviation,
a binary-digitizing circuit, operatively connected to said deviation detection circuit, for binary-digitizing said deviation signal to output a binary-digitized signal, and
a noise reduction circuit, operatively connected to said binary-digitizing circuit, for removing noise from said binary-digitized signal, said noise reduction circuit having a changeable noise reduction characteristic.

10. A track search apparatus according to claim 11, wherein said noise reduction circuit is adapted so that its noise reduction characteristic is changed in accordance with the period of the signal output therefrom.

11. A track search apparatus according to claim 7, wherein said driving pulse has a substantially triangular shape.

12. A track search apparatus according to claim 11, wherein said driving pulse has a width which is changed in accordance with the velocity signal from said velocity detection means.

13. A track search apparatus according to claim 11, wherein said driving pulse has a peak value which is changed in accordance with the velocity signal from said velocity detection means.

14. A track search apparatus according to claim 1, wherein said noise reduction circuit comprises a first removal circuit for measuring the pulse width of the binary-digitized signal from said binary-digitized signal from said binary-digitizing circuit and removing any pulse having a width shorter than a predetermined interval, and a second removal circuit, operatively connected to said first removal circuit, for removing pulses generated within a predetermined interval from a level changing point of the signal output from said first removal circuit.

15. A track search apparatus according to claim 14, wherein said driving pulse has a substantially triangular shape.

16. A track search apparatus according to claim 15, wherein said driving pulse has a width which is changed in accordance with the velocity signal from said velocity detection means.

17. A track search apparatus according to claim 15, wherein said driving pulse has a peak value which is changed in accordance with the velocity signal from said velocity detection means.

18. A high-speed track accessing apparatus for positionally shifting a signal conversion means for reproducing a signal to traverse signal tracks to move toward a selected target track on a recording medium and thereafter adjusting a shifting velocity of said conversion means at a predetermined position in front of the target track on said medium so as to cause said conversion means to access to the target track quickly and stably, said apparatus comprising:
shifting means for shifting said conversion means to move toward the target track;

means for detecting a shift of said conversion means relative to said tracks and outputting a shift signal representing said shift;

velocity detection means, connected to said shift detecting means, for detecting a shifting velocity of said conversion means from said shift signal and outputting a velocity signal representing said shifting velocity;

position detection means, connected to said shift detecting means, for detecting from the shift signal that said conversion means has arrived at the predetermined position in front of the target track and outputting a position arrival signal indicating arrival of said conversion means at said predetermined position; and adjustment pulse generation means, operatively connected to said shifting means, said velocity detection means and said position detection means, for applying a velocity adjusting drive pulse to said shifting means for a selected one of acceleration and deceleration thereof to the target track according to the velocity signal from said velocity detection means and in response to the position arrival signal from said position detection means, thereby enabling a quick and stable access of said conversion means to the target track.

* * * * *

UNITED STATES PATENT AND TRADEMARK OFFICE
CERTIFICATE OF CORRECTION

PATENT NO.  : 5,146,440
DATED       : September 8, 1992
INVENTOR(S) : Hiroyuki YAMAGUCHI et al It is certified that error appears in the above-identified patent and that said Letters Patent is hereby corrected as shown below:

Col. 17, line 6 should read --wherein said driving pulse has a substantially rectangular--.

Col. 17, line 61 should read --wherein said driving pulse has a substantially rectangular--.

Col. 18, line 26 should read --wherein said driving pulse has a substantially rectangular--.

Col. 18, line 48 should read --wherein said driving pulse has a substantially rectangular--.

Signed and Sealed this

Twenty-sixth Day of October, 1993

Attest:

BRUCE LEHMAN

Attesting Officer

Commissioner of Patents and Trademarks